(12) United States Patent
Reunamäki

(10) Patent No.: US 7,295,546 B2
(45) Date of Patent: Nov. 13, 2007

(54) METHOD FOR SYNCHRONIZING BLUETOOTH PACKETS

(75) Inventor: Jukka Reunamäki, Tampere (FI)

(73) Assignee: Nokia Corporation, Espoo (FI)

( * ) Notice: Subject to any disclaimer, the term of this patent is extended or adjusted under 35 U.S.C. 154(b) by 1015 days.

(21) Appl. No.: 10/378,036

(22) Filed: Feb. 26, 2003

(65) Prior Publication Data

US 2004/0165576 A1    Aug. 26, 2004

(51) Int. Cl.
*H04J 3/06* (2006.01)
(52) U.S. Cl. ....................................................... 370/350
(58) Field of Classification Search .................... None
See application file for complete search history.

(56) References Cited

U.S. PATENT DOCUMENTS

| 7,053,814 | B2* | 5/2006 | Yap .............................. 342/54 |
| 7,142,880 | B2* | 11/2006 | Schmandt et al. ........... 455/515 |
| 2004/0076117 | A1* | 4/2004 | Madapushi et al. ....... 370/230.1 |
| 2004/0109431 | A1* | 6/2004 | Abrahamson et al. ...... 370/342 |

OTHER PUBLICATIONS

*Bluetooth 1.1 Connect Without Cables,* 2nd Edition; J. Bray et al.; Prentice Hall, Inc., New Jersey; 2002; pp. 49-57.
"Radio 1.0 Improvements: Medium Rate Baseband Specification Proposal for version 0.7, Team BT1-MED"; H. Kafemann et al.; Bluetooth SIG; Jan. 2002; pp. 1-19.

* cited by examiner

*Primary Examiner*—Edan Orgad
*Assistant Examiner*—Blanche Wong
(74) *Attorney, Agent, or Firm*—Ware, Fressola, Van Der Sluys & Adolphson, LLP

(57) ABSTRACT

In Bluethooth medium rate packets, the access code and the header are frequently modulated by Gausian Frequency Shift Keying, and the actual payload is phase-modulated by a differential Quadrature Phase Shift Keying or an 8-ary DQPSK scheme. Guard time and a synchronization sequence are placed between the header and the payload parts because of the need to change the modulation scheme and because of the ease in packet transfer. A sequence having a form of ABA is added to a Barker sequence having a form of BABBAAA for providing the synchronization sequence having the form of ABABABBAAA, where A and B are different states in a binary representation.

20 Claims, 3 Drawing Sheets

METHOD FOR SYNCHRONIZING BLUETOOTH PACKETS

FIELD OF THE INVENTION

The present invention relates generally to a so-called Bluetooth communications system operating at radio frequencies around 2.45 GHz and, more particularly, to the synchronization of Bluetooth medium data rate packets.

BACKGROUND OF THE INVENTION

A Bluetooth system provides a communication channel between two electronic devices via a short-range radio link. In particular, the Bluetooth system operates in the radio frequency range around 2.45 GHz in the unlicensed Industrial-Scientific-Medical (ISM) band. The Bluetooth radio link is intended to be a cable replacement between portable and/or fixed electronic devices. The portable devices include mobile phones, communicators, audio is headsets, laptop computers, other GEOS-based or palm OS-based devices and devices with different operating systems.

The Bluetooth operating band is globally available, but the permissible bandwidth of the Bluetooth band and the available RF channels may be different from one country to another. Globally, the Bluetooth operating band falls within the 2400 MHz to 2483.5 MHz range. In the U.S. and in Europe, a band of 83.5 MHz bandwidth is available, and the band is divided into 79 RF channels spaced 1 MHz apart. Bluetooth network arrangements can be either point-to-point or point-to-multipoint to provide connection links among a plurality of electronic devices. Two to eight devices can be operatively connected into a piconet, wherein, at a given period, one of the devices serves as the master while the others are the slaves. Several piconets may form a larger communications network known as a scatternet, with each piconet maintaining its independence. The baseband protocol for a Bluetooth system combines circuit and packet switching. Circuit switching can be either asynchronous or synchronous. Up to three synchronous data (logical) channels, or one synchronous and one asynchronous data channel, can be supported on one physical channel. Each synchronous channel can support a 64 kb/s transfer rate while an asynchronous channel can transmit up to 721 kb/s in one direction and 57.6 kb/s in the opposite direction. If the link is symmetric, the transfer rate in the asynchronous channel can support 432.6 kb/s. A typical Bluetooth system consists of a radio link, a link control unit and a support unit for link management and host terminal interface functions. The Bluetooth link controller carries out the base band protocols and other low-level routines. Link layer messages for link set-up and control are defined in the Link Manager Protocol (LMP). In order to overcome the problems of radio noise interference and signal fading, frequency hopping is currently used to make the connections robust.

Currently, each of the 79 RF channels is utilized by a pseudo-random hopping sequence through the Bluetooth bandwidth. The hopping sequence is unique for each piconet and is determined by the Bluetooth device address of the master whose clock is used to determine the phase of the hopping sequence. The channel is divided into time slots of 625 µs in length and numbered according to the master clock, wherein each time slot corresponds to an RF hop frequency, and wherein each consecutive hop corresponds to a different RF hop frequency. The nominal hop rate is 1600 hops/s. All Bluetooth devices participating in the piconet are time and hop synchronized to the channel. The slot numbering ranges from 0 to $2^{27}-1$ and is cyclic with a cycle length of $2^{27}$. In the time slots, master and slave devices can transmit packets. Packets transmitted by the master or the slave device may extend up to five time slots. The RF hop frequency remains fixed for the duration of packet transmission.

A master device and a slave device can be linked together by an Asynchronous Connection-Less (ACL) link for a packet-switched connection or by a Synchronous Connection Oriented (SCO) link for a circuit-switched connection. With an ACL link, data can be carried in DH (Data High rate) packets or DM (Data Medium rate) packets. The DM packets carry less data, but provide extra error protection. Every packet consists of an access code, a header and a payload, as shown in FIG. 1. The access code is used to detect the presence of a packet and to address the packet to a specific device. The access code consists of a preamble, a synchronization word and a trailer, as shown in FIG. 2. The synchronization word contains a Barker sequence to improve the autocorrelation properties of the synchronization word.

Barker sequences are widely used in radar systems, and they have been introduced as basic signals for binary phase shift keying (BPSK) and Quadrature Phase-Shift Keying (QPSK) communication, making them members of the Direct Sequence (DS) class of spread-spectrum (SS) signals. The IEEE 802.11 Standard specifies the use of Barker sequences for the chip sequence used in DSSS systems. All known Barker sequences are listed in TABLE I.

TABLE I

| Code Length (N) | Barker Sequence |
| --- | --- |
| 1 | 1 |
| 2 | 11 or 10 |
| 3 | 110 |
| 4 | 1110 or 1101 |
| 5 | 1101 |
| 7 | 1110010 |
| 11 | 11100010010 |
| 13 | 1111100110101 |

The symbols in a Barker sequence are indicative of different states of a binary representation. Thus, the symbols "1" and "0" can also be shown as "+" and "−". Hereinafter, it is preferable to use the symbols "A" and "B" to define a Barker sequence, where "A" is different from "B" in a binary representation. For example, a 7-symbol Barker sequence can be AAABBAB or BBBAABA.

SUMMARY OF THE INVENTION

It is a primary object of the present invention to improve correlation properties near ideal symbol time in Bluetooth medium rate packets.

Thus, according to the first aspect of the present invention, there is provided a method for improving synchronization between one communication device and another communication device using a packet, wherein the packet comprises an access code, a header and a payload segment, and the access code comprises an N-symbol synchronization word for synchronization purposes, wherein the N-symbol synchronization word is a generalized Barker sequence either in a first form or a second form, wherein the second form is a reversed order of the first form, and wherein in the first form the generalized Barker sequence consists of a two-symbol part having a form of (BA) preceding an (N−2)-symbol part, and wherein in the second form the generalized Barker sequence consists of a two-symbol part having a form of (AB) following a different (N−2)-symbol part, and wherein A is different from B in a binary representation. The method comprises the step of:

extending the synchronization word for providing an extended synchronization word of at least (N+3) symbols by adding at least a 3-symbol sequence having a form of ABA immediately preceding the N-symbol synchronization word when the generalized is in the first form, and adding said at least a 3-symbol sequence immediately following the N-symbol synchronization word when the generalized Barker sequence is in the second form.

Furthermore, the method comprises the step of modulating the extended synchronization word with a phase value for providing an at least (N+3) differential phase shift keying symbols.

Preferably, N is equal to 7 and the generalized Barker sequence in the first form is BABBAAA, and the generalized Barker sequence in the second form is AAABBAB.

Advantageously, N can be smaller or greater than 7. When N is equal to 11, the generalized Barker sequence in the first form is BABBABBBAAA, and the generalized Barker sequence in the second form is AAABBBABBAB. When N is equal to 13, the generalized Barker sequence in the first form is BABABBAABBBBB, and the generalized Barker sequence in the second form is BBBBBAABBA-BAB. When N is equal to 5, the generalized Barker sequence in the first form is BABBB, and the generalized Barker sequence in the second form is BBBAB.

Preferably, the communication devices are Bluetooth devices, and the packet is a Bluetooth medium rate packet. The communication devices include mobile phones.

According to the second aspect of the present invention, there is provided a data structure embodied in an electronically readable medium for storage in at least one of a plurality of communication devices to allow said at least one communication device to synchronize with another of said plurality of communication devices using a packet, wherein the packet includes a synchronization word, and said data structure is used to correlate with the synchronization word in the packet for synchronization purpose. The structure comprises:

an N-symbol generalized Barker sequence, and an extension part comprising at least a 3-symbol sequence having a form of ABA, wherein A is a different state from B in a binary representation, and wherein the Barker is either in a first form or a second form, wherein the second form is a reversed order of the first form, and wherein in the first form the generalized Barker sequence consists of a two-symbol part having a form of (BA) preceding an (N−2)-symbol part, and wherein in the second form the generalized Barker sequence consists of a two-symbol part having a form of (AB) following a different (N−2)-symbol part; and wherein when the generalized Barker sequence is in the first form, the extension part is immediately preceding the generalized Barker sequence, and when the generalized Barker sequence is in the second form, the extension part is immediately following the generalized Barker sequence.

The present invention will become apparent upon reading the description taken in conjunction with FIGS. 3 to 5.

BEST MODE TO CARRY OUT THE INVENTION

The medium rate mode provides a straightforward extension of the Bluetooth specification by adding additional packet types. Medium rate provides a two-fold, and optionally, a three-fold increase in the data rate during the payload portion of certain packet types. The guiding principle was to minimize the complexity of medium rate.

A robust PSK scheme has been chosen to simplify the hardware integration of medium rate in the Bluetooth radios, addressing the low cost aspect. Narrow-band modulation, with RF channels of 1 MHz (3 dB bandwidth), has been chosen to be similar to the 1 MHz channel of the current Bluetooth 1.1 Specification. Depending on propagation conditions, $\pi/4$-DQPSK (Differential QPSK) or 8 DPSK can be applied with corresponding asymmetric ACL user data rates of up to 1.45 Mbps or 2.18 Mbps. For all of the medium rate packet types, the user data rate is effectively 2× or 3× of the basic rate equivalents. Basic rate is 1 Ms/s. Link adaptation can be applied to provide a link more resilient to errors at the expense of reduced user rate.

Whether or not a device is capable of supporting medium rate is indicated in the LMP_features message. A medium rate capable device may support the 2 Mbps mode only or both 2 Mbps and 3 Mbps. The master can enable the use of medium rate on ACL and/or extended SCO (eSCO) links separately for each of the medium rate capable slaves in the piconet.

Medium rate is an optional feature that can be used to complement the basic rate operation of a piconet, as specified in the Bluetooth 1.1 Specification or in combination with the new Radio1 Improvements. Medium rate can also be used to complement high rate by augmenting the data rate and eSCO options of the FH piconet, thereby allowing a large percentage of real time to be available in master or slaves for high rate subnet activities.

Regarding modulation and bit rate, medium rate has the same symbol rate as basic rate. The payload modulation is either $\pi/4$-DQPSK or 8 DPSK corresponding to the gross bit rate of 2 Mbps or 3 Mbps.

Figure 1:
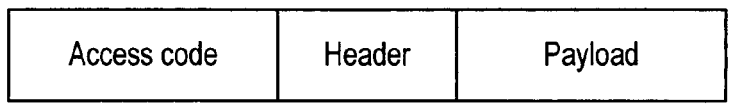
FIG. 1 shows a typical Bluetooth packet structure.
Figure 2:
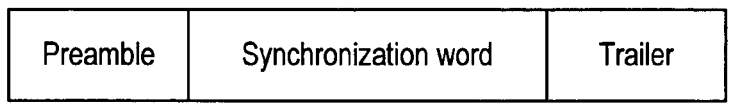
FIG. 2 shows a typical Bluetooth access code structure.
Figure 3:
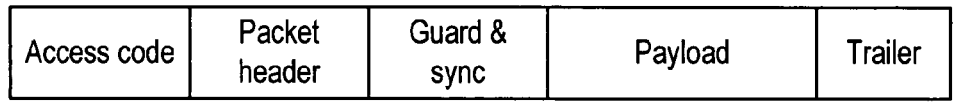
FIG. 3 shows a general format of a medium rate packet, according to the present invention.

The general format of the medium rate packet, according to the present invention, is shown in FIG. 3. The packet is similar to a basic rate packet. The maximum modulo-lengths (modulo the 625 μsec slot grid) are no greater than the longest basic rate packet plus two microseconds (DM3+two symbols). The access code and the packet header are identical in format and modulation so that the acquisition and packet identification are the same as basic rate. The main difference in the formats when compared to the basic rate packets is the addition of the guard time and synchronization sequence following the packet header. The guard time allows for settling and switching in the hardware during the transition from one modulation scheme to the other. Following the guard time is PSK-modulated synchronization that is used to complete acquisition prior to demodulating the π/4-DQPSK or 8 DPSK of the payload.

The access code is the same as that of basic rate packets. The format of the packet header is also the same as that of basic rate packets. However, if there is an extender header, this will follow the normal packet header and in triple-repeat GFSK (Gaussian Frequency Shift Keying) modulation. The normal, 54 μsec duration of the packet header would be increased by the presence of the extended header.

The contents of the packet header for medium rate packets have two additional rules:
1. When the slave has multiple logical links based on AM_ADDRs (active member addresses) using the header extension option, the master must choose the associated AM_ADDRs such that the base AM_ADDR (along with TYPE field) uniquely defines whether the packet is in medium rate or not.
2. The meaning of the TYPE field is modified if the link is operating in medium rate.

Following the packet header, medium rate packets have a guard time and synchronization sequence. Guard time and a synchronization sequence do not apply for the 1 Mbps packet types. The guard time must not exceed 5.25 μsec. The signal transmitted during the guard time must comply with the spectral requirements of the specifications.

Figure 4:
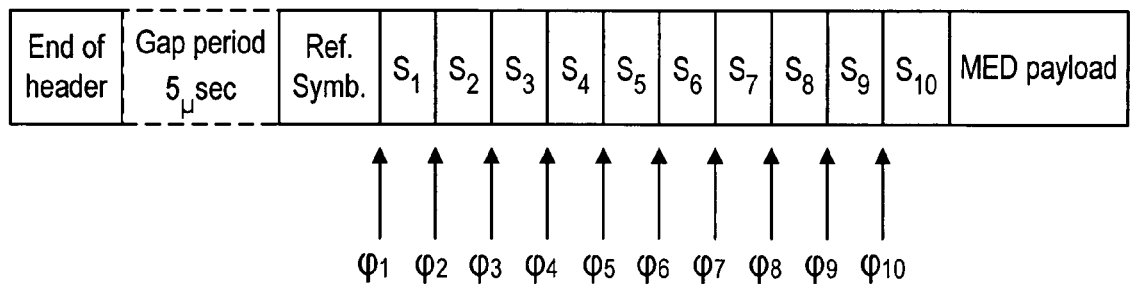
FIG. 4 shows a synchronization sequence, according to the present invention.

The symbol timing of the start of the synchronization sequence must be within ¼ μsec of the symbol timing of the last GFSK symbol of the header. The synchronization is identical for both π/4-DQPSK or 8 DPSK modulations. The synchronization sequence must be long enough to accommodate 11 PSK symbols. The synchronization sequence, according to the present invention, consists of a reference symbol (with arbitrary phase) followed by ten differential PSK symbols, as shown in FIG. 4.

The ten differential PSK symbol can be an extended synchronization sequence AAABBABABA, which consists of the 7-symbol Barker sequence AAABBAB, similar to that shown in TABLE I, and an added sequence of ABA following the 7-symbol Barker sequence. However, it is also possible to use another extended synchronization sequence ABABABBAAA to be the ten differential PSK symbol. It should be noted that the extended synchronization sequence ABABABBAAA is the reversed order of AAABBABABA. Thus, it is possible to extend the Barker sequence, as shown in TABLE I, or the Barker sequence in the reversed order to form an extended synchronization sequence.

Preferably, the extended sequence is formed by appending a sequence ABA to the 7-symbol Barker sequence in the reversed order. Accordingly, the phase changes between the symbols are defined as:

{φ1, φ2, φ3, φ4, φ5, φ6, φ7, φ8, φ9, φ10}={3π/4, −3π/4, 3π/4, −3π/4, 3π/4, −3π/4, −3π/4, 3π/4, 3π/4, 3π/4} where $\phi_1$ is the phase change between the reference symbol and the first PSK symbol $S_1$, and $\phi_k$ is the phase change between the $(k-1)^{th}$ symbol $S_{k-1}$ and the kth symbol $S_k$. As seen in FIG. 4, the synchronization code is the reversed order 7-symbol Barker-code BABBAAA preceded by a 3-symbol sequence in the form of ABA, where A and B are different states of a binary representation. Thus, the 10-symbol extended sequence has the form of ABABABBAAA. Here (A,B)=(1,0). However, (A,B) can be (0,1).

It has been found that the alternate bit sequence ABABAB in the front portion in the 10-symbol sequence ABABAB-BAAA, and the alternate bit sequence BABABA in the rear portion in the 10-symbol sequence AAABBABABA improve the correlation properties near ideal symbol time. For non-ideality estimation (e.g., frequency offset), the appended (ABA) sequence also makes the 7-symbol Barker sequence or its reversed form easy to use.

Packet Types

The access code and packet header (including optional extended packet header) are always transmitted at 1 Mbps (GFSK modulation scheme). The packet types contained in Segment 1 of TABLE II (NULL, POLL, FHS and DM1) are always transmitted at 1 Mbps. Segments 2, 3 and 4 may be transmitted either at 1 Mbps, 2 Mbps or 3 Mbps over the air rates as configured through LMP (link management protocol) commands. LMP messages are always sent using the DM1 packet type in 1 Mbps mode—even when medium rate is used for the other ACL packet types.

TABLE II

| Segment | TYPE code $b_3b_2b_1b_0$ | Slots | SCO link (1 Mbps) | eSCO link (1 Mbps) | eSCO link (⅔ Mbps) | ACL link (1 Mbps) [ptt = 0] | ACL link (⅔ Mbps) [ptt = 1] |
|---|---|---|---|---|---|---|---|
| 1 | 0000 | 1 | NULL | NULL | NULL | NULL | NULL |
|  | 0001 | 1 | POLL | POLL | POLL | POLL | POLL |
|  | 0010 | 1 | FHS | Undefined | Undefined | FHS | FHS |
|  | 0011 | 1 | DM1 | Undefined | Undefined | DM1 | DM1 |
| 2 | 0100 | 1 | Undefined | Undefined | Undefined | DH1 | 2-DH1 |
|  | 0101 | 1 | HV1 | Undefined | Undefined | Undefined | Undefined |
|  | 0110 | 1 | HV2 | Undefined | Undefined | Undefined | Undefined |
|  | 0111 | 1 | HV3 | EV3 | 2-EV3 | Undefined | Undefined |
|  | 1000 | 1 | DV | Undefined | Undefined | Undefined | 3-DH1 |
|  | 1001 | 1 | Undefined | Undefined | Undefined | AUX1 | AUX1 |
| 3 | 1010 | 3 | Undefined | Undefined | Undefined | DM3 | 2-DH3 |
|  | 1011 | 3 | Undefined | Undefined | Undefined | DH3 | 3-DH3 |
|  | 1100 | 3 | Undefined | EV4 | 2-EV5 | Undefined | Undefined |
|  | 1101 | 3 | Undefined | EV5 | 3-EV5 | Undefined | Undefined |
| 4 | 1110 | 5 | Undefined | Undefined | Undefined | DM5 | 2-DH5 |
|  | 1111 | 5 | Undefined | Undefined | Undefined | DH5 | 3-DH5 |

The selection of the packet type column in TABLE II is carried out independently for every base AM_ADDR a device is listening to. Modes for ACL and SCO are also selected independently. For ACL links, the medium rate mode is explicitly selected via LMP using the packet_type_ table (PTT) parameter. For SCO links, the medium rate mode is used only with eSCO links. The medium rate mode is selected when the eSCO link is established via LMP command.

The AUX1 packet will always be transmitted at 1 Mbps.

Payload Format

All medium rate ACL packets use the medium rate, 2-byte payload header. It should be noted that the LENGTH field in the payload headers for medium rate packets must be increased to handle the increased byte counts possible in these packets. At least one additional bit must be added to the multi-slot packet type payload header and at least two additional bits must be added to the single slot packet type payload header.

rate is to provide higher data rates and/or lower duty cycle over the radio link, it is counterproductive to use FEC. If a medium rate packet type does not deliver adequate radio link performance, a lower data rate option can be used.

The CRC that is used for error detection in ACL and the enhanced eSCO is the same as the 16-bit CRC that is used in basic rate. When there is a CRC on the packet, a retransmit scheme can be used just as it is defined in basic rate.

FEC Code: Rate 1/3

The rate 1/3 FEC is not used in medium rate.

FEC Code: Rate 2/3

The rate 2/3 FEC is not used in medium rate. ARQ Scheme and ERROR checking are the same as those defined for basic rate.

Logical Channels

Broadcast packets are sent on AM_ADDR=0 and would always be sent in 1 Mbps. LMP packets are sent via DM1 packets at 1 Mbps. When an SCO link is being established, the LMP commands define the parameters of the connection including modulation. Thus, at the time of setting up any SCO connection, the selection of 1, 2 or 3 Mbps rate is made.

For ACL links, the mode selection can be left to real time packet type selections. The proposed packet type table (PTT) allows the selection of basic rate or medium rate for each of the packet type codes. ACL traffic over this given physical or logical link would utilize the packet types in the given column of TABLE II.

Data Whitening

The whitening of packet6 headers for medium rate packets is the same as that specified in the Bluetooth 1.1 Specification.

No whitening is applied to the transmissions in the guard, synchronization and trailer portion of the medium rate packets. The packet header and the payload portion of medium rate packets are whitened by effectively pausing the LFSR (Linear Feedback Shift Register) during the guard and synchronization period. After the pause, the LFSR will continue the operation starting with the phase where it was before pause.

TABLE III

Payload Summary

| Type | Payload Header (bytes) | User Payload (bytes) | FEC | CRC | Symmetric Max Rate (kb/s) | Asymmetric Max Rate (kb/s) Forward | Asymmetric Max Rate (kb/s) Reverse |
|---|---|---|---|---|---|---|---|
| DM1 | 1 | 0-17 | 2/3 | Yes | 108.8 | 108.8 | 108.8 |
| DH1 | 1 | 0-27 | No | Yes | 172.8 | 172.8 | 172.8 |
| DM3 | 2 | 0-121 | 2/3 | Yes | 258.1 | 387.2 | 54.4 |
| DH3 | 2 | 0-183 | No | Yes | 390.4 | 585.6 | 86.4 |
| DM5 | 2 | 0-224 | 2/3 | Yes | 286.7 | 477.8 | 36.3 |
| DH5 | 2 | 0-339 | No | Yes | 433.9 | 723.2 | 57.6 |
| AUX1 | 1 | 0-29 | Optional | Optional | 185.6 | 185.6 | 185.6 |
| 2-DH1 | 2 | 0-54 | No | Yes | 345.6 | 345.6 | 345.6 |
| 2-DH3 | 2 | 0-367 | No | Yes | 782.9 | 1174.4 | 172.8 |
| 2-DH5 | 2 | 0-679 | No | Yes | 869.1 | 1448.5 | 115.2 |
| 3-DH1 | 2 | 0-83 | No | Yes | 531.2 | 531.2 | 531.2 |
| 3-DH3 | 2 | 0-552 | No | Yes | 1177.6 | 1766.4 | 265.6 |
| 3-DH5 | 2 | 0-1021 | No | Yes | 1306.9 | 2178.1 | 177.1 |

TABLE IV

| Type | Payload Header (bytes) | User Payload (bytes) | FEC | CRC | Symmetric Max Rate (kb/s) |
|---|---|---|---|---|---|
| HV1 | N/A | 10 | 1/3 | No | 64.0 |
| HV2 | N/A | 20 | 2/3 | No | 64.0 |
| HV3 | N/A | 30 | No | No | 64.0 |
| EV3[1] | N/A | 30 | No | Yes | 64.0 |
| EV4[1] | N/A | 120 | 2/3 | Yes | 256.0 |
| EV5[1] | N/A | 180 | No | Yes | 384.0 |
| DV | 1 | 10 + (0-9D) | 2/3 D | Yes D | 64.0 + 57.6D |
| 2-EV3[1] | N/A | 60 | No | Yes | 128.0 |
| 2-EV5[1] | N/A | 360 | No | Yes | 768.0 |
| 3-EV3[1] | N/A | 90 | No | Yes | 192.0 |
| 3-EV5[1] | N/A | 540 | No | Yes | 1152.0 |

Trailer

After the payload, two symbols trailer part will be added. The trailer bits will all be zero, i.e. {00, 00} for the π/4-DQPSK and {000, 000} for the 8 DPSK. The trailer symbols are used for receiver matched filter. Without the trailing, the last symbol would be distorted.

Error Control

Forward error correction (FEC) would provide limited benefit in medium rate. Given that the purpose of medium Medium Rate Medium rate is enabled on ACL links by the selection of a packet type table (PTT) that defines the parameters of each packet type code. There are separate PTTs for ACL links over each physical (unicast, multicast or broadcast) connection. A PTT is effectively an index or pointer to the desired column in TABLE II. The packet type options utilize combinations of the 1, 2 and 3 Mbps packet types. The SCO links medium rate is selected when the link is established.

Power Management

Medium rate provides power savings because it offers the ability to send a given amount of data in either fewer packets or with the same or similar number of packets but with shorter payloads. The Bluetooth power saving modes such as park or sniff are unchanged when medium rate is used. The establishment and execution of park and sniff mode are based on LMP messages, which are unchanged by medium rate.

Link Supervision

Link supervision is unaffected by the use of medium rate. The criteria for resetting the link supervision times are based solely on packet detection, HEC (header error check) and AM_ADDR check. Because they are the same for medium rate packets as for basic rate packets, all packets count toward the maintenance of the link status. A secondary impact on link supervision by medium rate is that medium rate will generally require the transmission of fewer data packets, and thus the duty cycle of usage will be reduced when medium rate is used. This needs to be accounted for in the choice of Tpoll values for each link. It should be noted that a connection may break down due to various reasons such as a device moving out of range or a power failure condition. Since this may happen without any prior warning, it is important to monitor the link on both the master side and the slave side to avoid possible collisions when the AM_ADDR is reassigned to another slave. To be able to supervise link loss, both the master and the slave use link supervision timers, Tpoll. Upon reception of a packet that passes the HEC check and has the correct AM_ADDR, the timer is reset. If at any time in the connection state the timer reaches the supervisionTO value, the connection is reset. The same timeout value is used for both SCO and ACL connections. The timeout period, supervisionTO, is negotiated at the LM level. Its value is chosen so that the supervision timeout will be longer than hold and sniff periods. Link supervision of a parked slave will be done by unparking and re-parking the slave.

Bluetooth Audio

Medium rate provides further options to create 64 kbps full duplex links to carry the CVSD encoded audio. The 2-EVx and 3-EVx packet types have payload segments with 2× or 3× the data content. This allows the use of packet intervals (Tesco) that are 2 or 3 times those of basic rate eSCO links. The power consumption to support a given link is also reduced because of the 2× or 3× lower packet rate over the air link. The penalty is that loss of a packet causes loss of more data and hence a longer real-time segment of the audio.

Generalized Barker Sequence

In a synchronization sequence that requires ten differential PSK symbols, the present invention adds a 3-symbol sequence in the form of ABA to the back of a 7-symbol Barker sequence having the form of AAABBAB. Likewise, the present invention adds the same 3-symbol in the form of ABA in the front of a reversed 7-symbol Barker sequence BABBAAA. For simplicity, we use the term "generalized Barker sequence" to denote a Barker sequence or its reversed order.

Extended Synchronization Sequence

In a synchronization sequence that requires ten differential PSK symbols, the present invention adds a 3-symbol sequence in the form of ABA to the front of a generalized 7-symbol Barker sequence having the form of BABBAAA so as to achieve an alternate sequence of ABABA that is sufficiently long. However, the length of the alternate sequence is not limited to five symbols. The length of the alternate sequence can be more than five symbols. For example, a 5-symbol sequence in the form of ABABA can be added in front of the generalized 7-symbol Barker sequence of BABBAAA when a synchronization sequence requires twelve differential PSK symbols.

Along with this logic, when a synchronization sequence requires fourteen differential PSK symbols, it is possible to use a 3-symbol sequence in the form of ABA to append to an 11-symbol Barker sequence having the form of AAABB-BABBAB (or BABBABBBAAA) so as to achieve an alternate sequence of ABABA. Likewise, when a synchronization sequence requires sixteen differential PSK symbols, it is possible to use a 3-symbol sequence in the form of BAB to append to a 13-symbol Barker sequence having the form of AAAAABBAABABA (or BABABBAABBBBB) to obtain a 16-symbol extended sequence of AAAAABBAABABA-BAB (or BABABABABABBBAABBBBB).

It should also be noted that in any generalized N-symbol Barker sequence (N-symbol Barker sequence or its reversed order), where N is equal to or greater than three, there is always a 2-symbol part having a form of (AB) or (BA) either preceding or following the (N−2)-symbol part. When a generalized Barker sequence consists of a two-symbol part having a form (BA) preceding the (N−2)-symbol part, we refer to this generalized Barker sequence as being in a first form. This generalized Barker sequence can be extended to become an (N+3)-symbol sequence by adding ABA in front of the generalized Barker sequence. When a generalized Barker sequence consists of a two-symbol part having a form (AB) following the (N−2)-symbol part, we refer to this generalized Barker sequence as being in a second form. This generalized Barker sequence can be extended to become an (N+3) symbol sequence by adding ABA in the back of the generalized Barker sequence.

Figure 6:
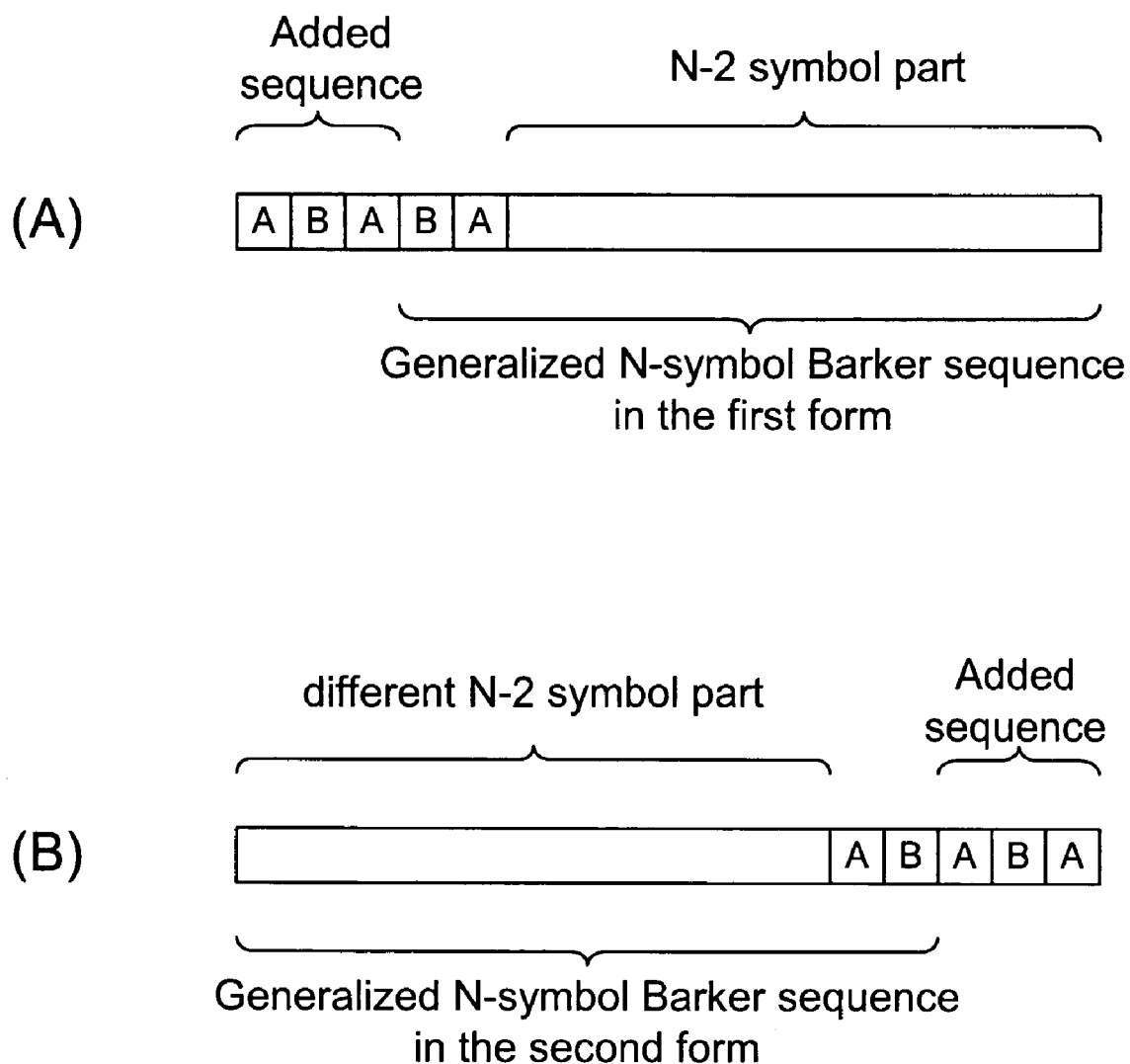
FIG. 6a illustrates the relationship between an added sequence and one form of an N-symbol generalized Barker sequence.
FIG. 6b illustrates the relationship between an added sequence and another form of the N-symbol generalized Barker sequence.

The relationships between the added ABA sequence and the two forms of an N-symbol generalized Barker sequence are illustrated in FIGS. 6a and 6b.

Figure 5:
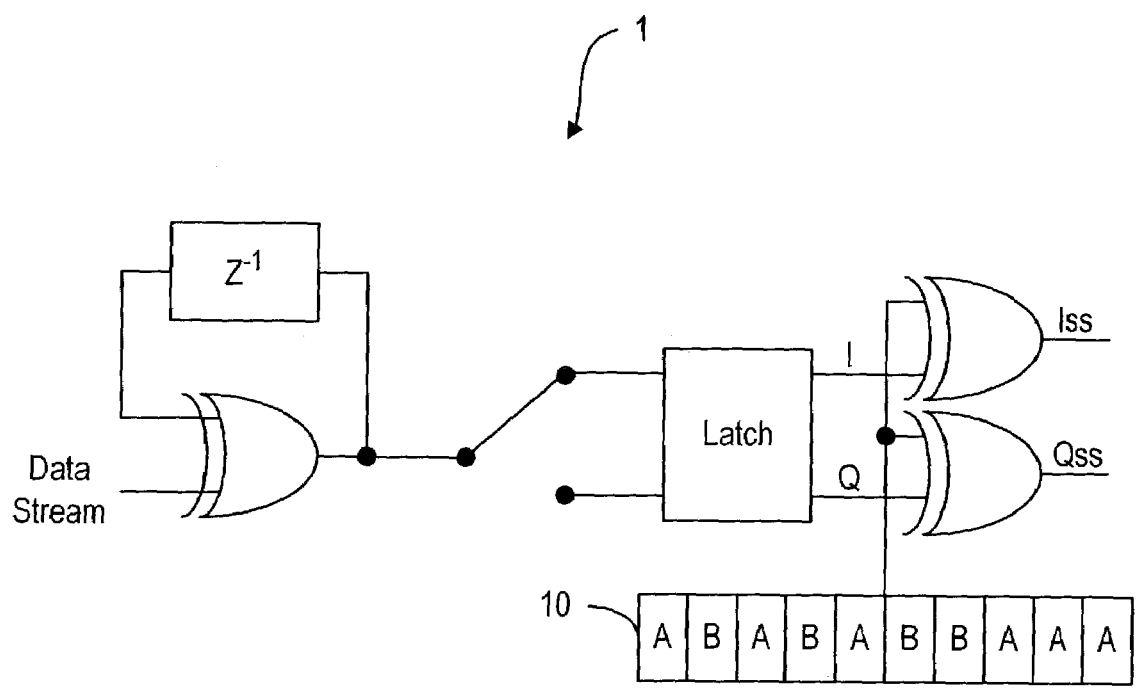
FIG. 5 is a schematic representation showing part of an encoder that uses an extended Barker sequence, according to the present invention.

The extended sequence, such as ABABABBAAA (ABA immediately preceding a 7-symbol Barker sequence of BABBAAA), can be a data structure embodied in an electronically readable medium for storage in a communication device, as shown in FIG. 5. For example, the extended sequence can be stored in a readable memory 10 in an encoder 1 for carrying out DPSK modulation in a DSSS system. The DSSS system can be a part of a Bluetooth medium rate device or other communication device. The DSSS system can be a part of a mobile phone.

Thus, although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method for improving synchronization between one communication device and another communication device using a packet, wherein the packet comprises an access code, a header and a payload segment, and the access code comprises an N-symbol synchronization word for synchronization purposes, wherein N is a positive integer and wherein the N-symbol synchronization word is a generalized Barker sequence either in a first form or a second form with symbols A and B, wherein in the first form the generalized Barker sequence consists of a two-symbol part having a form of BA preceding an N-2-symbol part, and wherein in the second form the generalized Barker sequence consists of a two-symbol part having a form of AB following a different N-2-symbol part, and wherein A is different from B in a binary representation, said method comprising:

adding at least a 3-symbol sequence having a form of ABA immediately preceding the N-symbol synchronization word when the generalized Barker sequence is in the first form, and adding said at least 3-symbol sequence immediately following the N-symbol synchronization word when the generalized Barker sequence is in the second form.

2. The method of claim 1, further comprising
modulating the extended synchronization word with a phase value for providing an at least N+3 differential phase shift keying symbols.

3. The method of claim 1, wherein A is equal to 1 and B is equal to 0.

4. The method of claim 1, wherein N is equal to 7, and the generalized Barker sequence in the first form is BABBAAA, and the generalized Barker sequence in the second form is AAABBAB.

5. The method of claim 4, wherein A is equal to 1 and B is equal to 0.

6. The method of claim 1, wherein N is equal to 11, and the generalized Barker sequence in the first form is BABBABBBAAA, and the generalized Barker sequence in the second form is AAABBBABBAB.

7. The method of claim 6, wherein A is equal to 1 and B is equal to 0.

8. The method of claim 1, wherein N is equal to 13, and the generalized Barker sequence in the first form is BABABBAABBBBB, and the generalized Barker sequence in the second form is BBBBBAABBABAB.

9. The method of claim 8, wherein B is equal to 1 and A is equal to 0.

10. The method of claim 1, wherein N is equal to 5, and the generalized Barker sequence in the first form is BABBB, and the generalized Barker sequence in the second form is BBBAB.

11. The method of claim 1, wherein said one and another communication devices comprise Bluetooth devices.

12. The method of claim 1, wherein the packet comprises a Bluetooth packet.

13. The method of claim 1, wherein the packet comprises a Bluetooth medium rate packet.

14. A data structure embodied in an electronically readable medium for storage in at least one of a plurality of communication devices to allow said at least one communication device to synchronize with another of said plurality of communication devices using a packet, wherein the packet includes a synchronization word, and said data structure is used to correlate with the synchronization word in the packet for synchronization purpose, said data structure comprising:

an N-symbol generalized Barker sequence, wherein N is positive integer, and an extension part comprising at least a 3-symbol sequence having a form of ABA, wherein A and B are symbols and A is a different state from B in a binary representation, and wherein the generalized Barker sequence is either in a first form or a second form, wherein in the first form the generalized Barker sequence consists of a two-symbol part having a form of BA preceding an N-2-symbol part, and wherein in the second form the generalized Barker sequence consists of a two-symbol part having a form of AB following a different N-2-symbol part; and wherein when the generalized Barker sequence is in the first form, the extension part is immediately preceding the generalized Barker sequence, and when the generalized Barker sequence is in the second form, the extension part is immediately following the generalized Barker sequence.

15. The data structure of claim 14, wherein N is equal to 7, and the generalized Barker sequence in the first form is BABBAAA, and the generalized Barker sequence in the second form is AAABBAB.

16. The data structure of claim 14, wherein N is equal to 11, and the generalized Barker sequence in the first form is BABBABBBAAA, and the generalized Barker sequence in the second form is AAABBBABBAB.

17. The data structure of claim 14, wherein N is equal to 13, and the generalized Barker sequence in the first form is BABABBAABBBBB, and the generalized Barker sequence in the second form is BBBBBAABBABAB.

18. The data structure of claim 14, wherein N is equal to 5, and the generalized Barker sequence in the first form is BABBB and the generalized Barker sequence in the second form is BBBAB.

19. The data structure of claim 14, wherein said plurality of communication devices include a mobile terminal.

20. The data structure of claim 14, wherein said plurality of communication devices include Bluetooth devices.

* * * * *